US009021808B2

United States Patent
Nelson et al.

(10) Patent No.: US 9,021,808 B2
(45) Date of Patent: May 5, 2015

(54) RANKINE CYCLE WASTE HEAT RECOVERY SYSTEM

(75) Inventors: Christopher R. Nelson, Columbus, IN (US); Timothy C. Ernst, Columbus, IN (US)

(73) Assignee: Cummins Intellectual Property, Inc., Columbus, IN (US)

( * ) Notice: Subject to any disclaimer, the term of this patent is extended or adjusted under 35 U.S.C. 154(b) by 183 days.

(21) Appl. No.: 13/347,322

(22) Filed: Jan. 10, 2012

(65) Prior Publication Data

US 2012/0198839 A1    Aug. 9, 2012

Related U.S. Application Data

(60) Provisional application No. 61/431,300, filed on Jan. 10, 2011, provisional application No. 61/431,298, filed on Jan. 10, 2011.

(51) Int. Cl.

| | | |
|---|---|---|
| *F02G 3/00* | (2006.01) | |
| *F02M 25/07* | (2006.01) | |
| *F01K 23/10* | (2006.01) | |
| *F01K 23/06* | (2006.01) | |

(Continued)

(52) U.S. Cl.
CPC ................. *F01N 5/02* (2013.01); *F01N 3/2066* (2013.01); *F01N 2610/02* (2013.01); *F02B 29/0425* (2013.01); *F02B 47/10* (2013.01); *F02G 5/02* (2013.01); *F02M 25/071* (2013.01); *F02M 25/073* (2013.01); *F02M 25/0739* (2013.01); *F02M 25/0754* (2013.01); *Y02T 10/121* (2013.01); *Y02T 10/16* (2013.01); *Y02T 10/166* (2013.01); *F01K 23/065* (2013.01); *F01K 25/08* (2013.01)

(58) Field of Classification Search
CPC ........ F02B 29/0425; F02B 47/10; F02G 5/02; F02M 25/071; F02M 25/073; F02M 25/0739
USPC ......... 60/39.5, 39.52, 605.1–605.2, 645, 670, 60/616, 618, 597–598; 123/568.18
See application file for complete search history.

(56) References Cited

U.S. PATENT DOCUMENTS

| | | |
|---|---|---|
| 3,232,052 A | 2/1966 | Ricard |
| 3,789,804 A | 2/1974 | Aguet |

(Continued)

FOREIGN PATENT DOCUMENTS

| | | |
|---|---|---|
| EP | 1 273 785 B1 | 5/2007 |
| JP | 60-222511 A | 11/1985 |

(Continued)

OTHER PUBLICATIONS

International Search Report and Written Opinion of the International Searching Authority mailed Apr. 25, 2012 from corresponding International Application No. PCT/US2012/020778.

*Primary Examiner* — Thai Ba Trieu
*Assistant Examiner* — Jason T Newton
(74) *Attorney, Agent, or Firm* — Foley & Lardner LLP

(57) ABSTRACT

A Rankine cycle waste heat recovery system associated with an internal combustion engine is in a configuration that enables handling of exhaust gas recirculation (EGR) gas by using the energy recovered from a Rankine cycle waste heat recovery system. The system includes a control module for regulating various function of the internal combustion engine and its associated systems along with the Rankine cycle waste heat recovery system.

19 Claims, 2 Drawing Sheets

(51) Int. Cl.
| | |
|---|---|
| F01N 5/02 | (2006.01) |
| F02B 47/10 | (2006.01) |
| F02G 5/02 | (2006.01) |
| F01K 25/08 | (2006.01) |
| F01N 3/20 | (2006.01) |
| F02B 29/04 | (2006.01) |

(56) References Cited

U.S. PATENT DOCUMENTS

| | | |
|---|---|---|
| 4,009,587 A | 3/1977 | Robinson, Jr. et al. |
| 4,164,850 A | 8/1979 | Lowi, Jr. |
| 4,204,401 A | 5/1980 | Earnest |
| 4,232,522 A | 11/1980 | Steiger |
| 4,267,692 A | 5/1981 | Earnest |
| 4,271,664 A | 6/1981 | Earnest |
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |
| 5,649,513 A | 7/1997 | Kanda |
| 5,685,152 A | 11/1997 | Sterling |
| 5,771,868 A * | 6/1998 | Khair ................ 123/568.12 |
| 5,791,146 A * | 8/1998 | Dungner ................ 60/605.2 |
| 5,806,322 A | 9/1998 | Cakmakci et al. |
| 5,915,472 A | 6/1999 | Takikawa et al. |
| 5,950,425 A | 9/1999 | Takahashi et al. |
| 5,974,792 A * | 11/1999 | Isobe ..................... 60/278 |
| 6,014,856 A | 1/2000 | Bronicki et al. |
| 6,035,643 A | 3/2000 | Rosenblatt |
| 6,055,959 A | 5/2000 | Taue |
| 6,138,649 A * | 10/2000 | Khair et al. ............ 123/568.12 |
| 6,301,890 B1 | 10/2001 | Zeretzke |
| 6,321,697 B1 | 11/2001 | Matsuda et al. |
| 6,324,849 B1 | 12/2001 | Togawa et al. |
| 6,393,840 B1 | 5/2002 | Hay |
| 6,494,045 B2 | 12/2002 | Rollins, III |
| 6,523,349 B2 | 2/2003 | Viteri |
| 6,571,548 B1 | 6/2003 | Bronicki et al. |
| 6,598,397 B2 | 7/2003 | Hanna et al. |
| 6,606,848 B1 | 8/2003 | Rollins, III |
| 6,637,207 B2 | 10/2003 | Konezciny et al. |
| 6,701,712 B2 | 3/2004 | Bronicki et al. |
| 6,715,296 B2 | 4/2004 | Bakran et al. |
| 6,745,574 B1 | 6/2004 | Dettmer |
| 6,748,934 B2 | 6/2004 | Natkin et al. |
| 6,751,959 B1 | 6/2004 | McClanahan et al. |
| 6,792,756 B2 | 9/2004 | Bakran et al. |
| 6,810,668 B2 | 11/2004 | Nagatani et al. |
| 6,817,185 B2 | 11/2004 | Coney et al. |
| 6,848,259 B2 | 2/2005 | Keller-Sornig et al. |
| 6,877,323 B2 | 4/2005 | Dewis |
| 6,880,344 B2 | 4/2005 | Radcliff et al. |
| 6,910,333 B2 | 6/2005 | Minemi et al. |
| 6,964,168 B1 | 11/2005 | Pierson et al. |
| 6,977,983 B2 | 12/2005 | Correia et al. |
| 6,986,251 B2 | 1/2006 | Radcliff et al. |
| 7,007,487 B2 | 3/2006 | Belokon et al. |
| 7,028,463 B2 * | 4/2006 | Hammond et al. ......... 60/278 |
| 7,044,210 B2 | 5/2006 | Usui |
| 7,069,884 B2 | 7/2006 | Baba et al. |
| 7,117,827 B1 | 10/2006 | Hinderks |
| 7,121,906 B2 | 10/2006 | Sundel |
| 7,131,259 B2 | 11/2006 | Rollins, III |
| 7,131,290 B2 | 11/2006 | Taniguchi et al. |
| 7,159,400 B2 | 1/2007 | Tsutsui et al. |
| 7,174,716 B2 | 2/2007 | Brasz et al. |
| 7,174,732 B2 | 2/2007 | Taniguchi et al. |
| 7,191,740 B2 | 3/2007 | Baba et al. |
| 7,200,996 B2 | 4/2007 | Cogswell et al. |
| 7,225,621 B2 | 6/2007 | Zimron et al. |
| 7,281,530 B2 | 10/2007 | Usui |
| 7,325,401 B1 | 2/2008 | Kesseli et al. |
| 7,340,897 B2 | 3/2008 | Zimron et al. |
| 7,444,804 B2 * | 11/2008 | Hashizume ............... 60/297 |
| 7,454,911 B2 | 11/2008 | Tafas |
| 7,469,540 B1 | 12/2008 | Knapton et al. |
| 7,578,139 B2 | 8/2009 | Nishikawa et al. |
| 7,665,304 B2 * | 2/2010 | Sundel .................... 60/671 |
| 7,721,552 B2 | 5/2010 | Hansson et al. |
| 7,797,940 B2 | 9/2010 | Kaplan |
| 7,823,381 B2 | 11/2010 | Misselhorn |
| 7,833,433 B2 | 11/2010 | Singh et al. |
| 7,866,157 B2 | 1/2011 | Ernst et al. |
| 7,942,001 B2 | 5/2011 | Radcliff et al. |
| 7,958,873 B2 | 6/2011 | Ernst et al. |
| 7,997,076 B2 | 8/2011 | Ernst |
| 8,176,736 B2 * | 5/2012 | Janssen .................. 60/605.2 |
| 8,522,756 B2 * | 9/2013 | Vuk et al. ............... 123/568.12 |
| 2002/0099476 A1 | 7/2002 | Hamrin et al. |
| 2003/0033812 A1 | 2/2003 | Gerdes et al. |
| 2003/0154716 A1 * | 8/2003 | Redon .................... 60/605.2 |
| 2003/0213245 A1 | 11/2003 | Yates et al. |
| 2003/0213246 A1 | 11/2003 | Coll et al. |
| 2003/0213248 A1 | 11/2003 | Osborne et al. |
| 2005/0262842 A1 | 12/2005 | Claassen et al. |
| 2007/0220885 A1 * | 9/2007 | Turner et al. ............ 60/605.2 |
| 2007/0277514 A1 * | 12/2007 | Kammel ................... 60/302 |
| 2008/0289313 A1 | 11/2008 | Batscha et al. |
| 2009/0031724 A1 * | 2/2009 | Ruiz ........................ 60/618 |
| 2009/0090109 A1 | 4/2009 | Mills et al. |
| 2009/0121495 A1 | 5/2009 | Mills |
| 2009/0133646 A1 | 5/2009 | Wankhede et al. |
| 2009/0151356 A1 | 6/2009 | Ast et al. |
| 2009/0179429 A1 | 7/2009 | Ellis et al. |
| 2009/0211253 A1 * | 8/2009 | Radcliff et al. ............ 60/670 |
| 2009/0241543 A1 * | 10/2009 | Ernst ..................... 60/645 |
| 2009/0320477 A1 | 12/2009 | Juchymenko |
| 2009/0322089 A1 | 12/2009 | Mills et al. |
| 2010/0018207 A1 | 1/2010 | Juchymenko |
| 2010/0071368 A1 | 3/2010 | Kaplan et al. |
| 2010/0083919 A1 | 4/2010 | Bucknell |
| 2010/0139626 A1 | 6/2010 | Raab et al. |
| 2010/0180584 A1 | 7/2010 | Berger et al. |
| 2010/0180591 A1 * | 7/2010 | Cornwell et al. .......... 60/602 |
| 2010/0192569 A1 | 8/2010 | Ambros et al. |
| 2010/0229525 A1 | 9/2010 | Mackay et al. |
| 2010/0257858 A1 | 10/2010 | Yaguchi et al. |
| 2010/0263380 A1 | 10/2010 | Biederman et al. |
| 2010/0282221 A1 * | 11/2010 | Le Lievre ................ 123/559.1 |
| 2010/0288571 A1 | 11/2010 | Dewis et al. |
| 2010/0293943 A1 * | 11/2010 | Teng et al. .............. 60/602 |
| 2011/0005477 A1 | 1/2011 | Terashima et al. |
| 2011/0006523 A1 | 1/2011 | Samuel |
| 2011/0094224 A1 * | 4/2011 | Sheidler et al. ........... 60/605.2 |
| 2011/0094485 A1 * | 4/2011 | Vuk et al. ............... 123/568.21 |
| 2011/0094486 A1 * | 4/2011 | Vuk ..................... 123/568.21 |
| 2011/0209473 A1 | 9/2011 | Fritz et al. |
| 2011/0232279 A1 * | 9/2011 | Zielke et al. ............. 60/600 |
| 2011/0239643 A1 * | 10/2011 | LeJeune ................. 60/598 |
| 2012/0023946 A1 | 2/2012 | Ernst et al. |
| 2014/0013743 A1 * | 1/2014 | Dane ..................... 60/615 |
| 2014/0075936 A1 * | 3/2014 | Teng et al. .............. 60/605.2 |

FOREIGN PATENT DOCUMENTS

| | | |
|---|---|---|
| JP | 8-68318 A | 3/1996 |
| JP | 9-32653 A | 2/1997 |
| JP | 10-238418 A | 9/1998 |
| JP | 11-166453 A | 6/1999 |
| JP | 2005-36787 A | 2/2005 |
| JP | 2005-42618 A | 2/2005 |

(56) References Cited

FOREIGN PATENT DOCUMENTS

| JP | 2005-201067 A | 7/2005 |
|---|---|---|
| JP | 2005-329843 A | 12/2005 |
| JP | 2008-240613 A | 10/2008 |
| JP | 2009-167995 A | 7/2009 |
| JP | 2009-191647 A | 8/2009 |
| JP | 2010-77964 A | 4/2010 |
| WO | 2009/098471 A2 | 8/2009 |

* cited by examiner

RANKINE CYCLE WASTE HEAT RECOVERY SYSTEM

CROSS-REFERENCE TO RELATED APPLICATIONS

This application claims the benefit of priority to U.S. Provisional Patent Application No. 61/431,298, filed on Jan. 10, 2011, and No. 61/431,300, filed on Jan. 10, 2011, which are hereby incorporated by reference in their entirety.

TECHNICAL FIELD

This disclosure relates to Rankine cycle waste heat recovery systems and to a configuration that enables techniques for handling of exhaust gas recirculation (EGR) gas by using the energy recovered from a Rankine cycle waste heat recovery system.

BACKGROUND

EGR is a technique used in internal combustion engines to mitigate emissions of NOx. An internal combustion engine may suffer an efficiency penalty due to the work required to drive the recirculated exhaust gas directly from an engine's exhaust manifold to an engine's intake system.

The recirculated exhaust gas may need cooled prior to reentry into the intake system. The cooled gas reduces the oxygen content of the combustion mixture and reduces the temperature of the combustion mixture in the combustion chamber, decreasing the formation of NOx. Key components of an EGR system may include a turbocharger, an EGR cooler, and an EGR flow control valve. The turbocharger includes a compressor that is couples to and is driven by a turbine. The EGR cooler may be an air-air charge cooler. The EGR flow control valve regulates exhaust flow through the EGR circuit. An engine's electronic control module (ECM) may operate the EGR flow control valve.

While the EGR system provides a variety of advantages to operation of an internal combustion engine, it also requires energy for moving the exhaust gas and cooling the exhaust gas. Using waste heat to operate the EGR system could improve the efficiency of operation of an engine using an EGR system.

SUMMARY

This disclosure provides an internal combustion engine, comprising an exhaust system, an EGR system, and a Rankine cycle waste heat recovery system. The exhaust system is operable to transport an exhaust gas and includes an exhaust outlet. A turbocharger turbine is positioned along the exhaust system. An aftertreatment system is positioned along the exhaust system downstream from the turbocharger turbine. The EGR system is connected to the exhaust system downstream of the aftertreatment system and is operable to divert a portion of the exhaust gas from the exhaust system. The EGR system is connected to an intake system of the internal combustion engine. The EGR system includes an EGR pump adapted to selectively control a flow rate of EGR gas into the intake system. The Rankine cycle waste heat recovery system includes a waste heat recovery circuit. A working fluid pump is positioned along the waste heat recovery circuit. An EGR heat exchanger is positioned along the waste heat recovery circuit downstream from the working fluid pump and adapted to receive the EGR gas. An exhaust gas boiler is positioned along the waste heat recovery circuit downstream from the EGR heat exchanger and adapted to receiver exhaust gas. An energy conversion portion is positioned along the waste heat recovery circuit downstream from the exhaust gas boiler and operable to drive the EGR pump. A condenser is positioned along the waste heat recovery circuit downstream from the energy conversion portion and upstream from the working fluid pump.

This disclosure also provides an internal combustion engine, comprising an exhaust system, an EGR system, a Rankine cycle waste heat recovery system and a control system. The exhaust system is operable to transport an exhaust gas and includes an exhaust outlet. A turbocharger turbine is positioned along the exhaust system. An aftertreatment system is positioned along the exhaust system downstream from the turbocharger turbine. The EGR system is connected to the exhaust system downstream of the aftertreatment system and is operable to divert a portion of the exhaust gas from the exhaust system. The EGR system is connected to an intake system of the internal combustion engine. The EGR system includes an EGR pump adapted to selectively control a flow rate of EGR gas into the intake system. The Rankine cycle waste heat recovery system includes a waste heat recovery circuit. A working fluid pump is positioned along the waste heat recovery circuit. An EGR heat exchanger is positioned along the waste heat recovery circuit downstream from the working fluid pump and adapted to receive the EGR gas. An exhaust gas boiler is positioned along the waste heat recovery circuit downstream from the EGR heat exchanger and adapted to receiver exhaust gas. An energy conversion portion is positioned along the waste heat recovery circuit downstream from the exhaust gas boiler. The energy conversion portion has an output operable to drive the EGR pump. A condenser is positioned along the waste heat recovery circuit downstream from the energy conversion portion and upstream from the working fluid pump. The control system is operable to control the output of the energy conversion portion.

Advantages and features of the embodiments of this disclosure will become more apparent from the following detailed description of exemplary embodiments when viewed in conjunction with the accompanying drawings.

DETAILED DESCRIPTION

Figure 1:
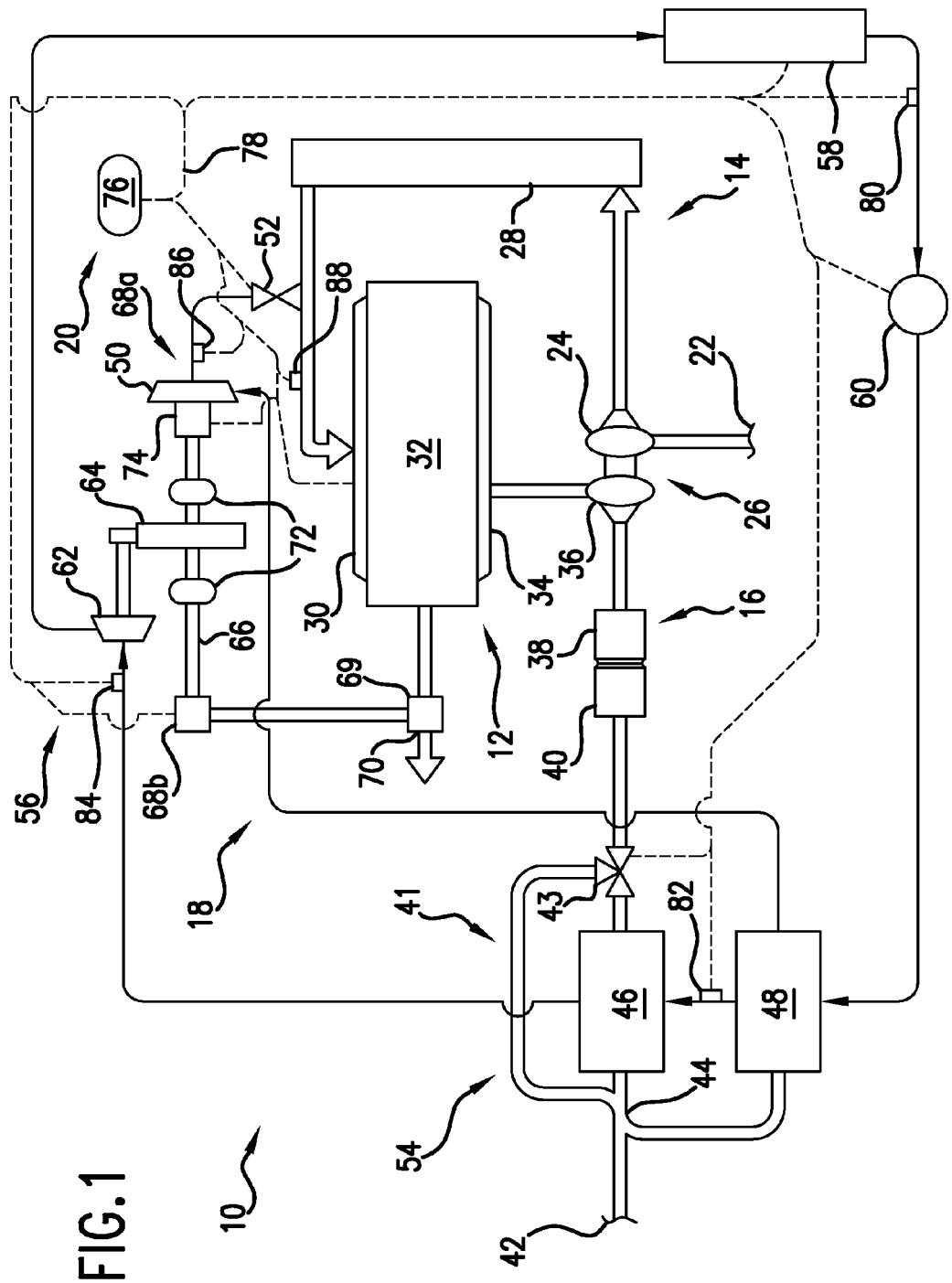
FIG. 1 is a schematic of an internal combustion engine and a Rankine cycle waste heat recovery system in accordance with a first exemplary embodiment of the present disclosure.

FIG. 1 shows a Rankine cycle waste heat recovery (WHR) circuit 10 associated with an internal combustion engine 12 in accordance with an exemplary embodiment of the present disclosure. Engine 12 includes an intake system 14, an exhaust system 16, an EGR system 18, and an engine block 32. A control system 20 may receive signals from and send control signals to one or more of engine 12, intake system 14, exhaust system 16, and EGR system 18.

Intake system 14 includes an inlet 22, a turbocharger compressor 24, which is part of turbocharger 26, positioned downstream of inlet 22, and a charge air cooler 28 positioned downstream of compressor 24. Cooler 28 may be an air-air cooler. Downstream from cooler 28 is an intake manifold 30, which is attached to engine block 32.

Exhaust system 16 includes an exhaust manifold 34 attached to engine block 32 and a turbocharger turbine 36, which is part of turbocharger 26, positioned downstream from exhaust manifold 34. Exhaust system 16 may terminate in an exhaust outlet 42, which may be an exhaust pipe or stack 42. Exhaust system 16 may further include a diesel particulate filter 38 positioned between turbine 36 and exhaust outlet 42 and a selective catalytic reduction (SCR) device 40 positioned downstream from diesel particulate filter 38. Collectively, filter 38 and catalytic device 40 form an aftertreatment system, which may include other elements. Positioned along exhaust system 16 between exhaust outlet 42 and SCR device 40 is an exhaust cooler/boiler 46, which is also part of WHR circuit 10, as will be described in more detail hereinbelow. An exhaust cooler bypass 41 may connect to exhaust system 16 upstream from exhaust cooler 16 and downstream from the aftertreatment system. Exhaust cooler bypass 41 then extends around exhaust cooler 46 and reconnects to exhaust system 16 downstream from exhaust cooler 46.

EGR system 18 includes an EGR inlet 44 and a low-pressure EGR cooler 48 positioned downstream from EGR inlet 44. EGR system 18 may further include an EGR pump 50 positioned downstream from low-pressure EGR cooler 48 and an EGR flow control valve 52 positioned downstream from EGR pump 50 and upstream from intake system 14. EGR system 18 connects to intake system 14 between charge air cooler 28 and intake manifold 30.

Rankine cycle WHR circuit 10 includes a heat exchange portion 54, an energy conversion portion 56, a working fluid cooling and containment portion 58, and a feed pump 60. Working fluid cooling and containment portion 58 may include a sub-cooler fluidly connected to a condenser downstream from the condenser and a receiver that may connect with the condenser and sub-cooler in various known configurations. WHR circuit 10 may also include a recuperator (not shown) positioned along the working fluid circuit and receiving vaporized working fluid. The recuperator may also include a bypass mechanism around the recuperator. One embodiment of a recuperator incorporating a bypass is evidenced in commonly owned U.S. Pat. No. 7,997,076, which is incorporated herein by reference in its entirety.

Heat exchange portion 54 is positioned along WHR circuit 10 downstream from working fluid cooling and containment portion 58, while feed pump 60 is positioned between working fluid cooling and containment portion 58 and heat exchange portion 54. Positioned between heat exchange portion 54 and working fluid cooling and containment portion 58 is energy conversion portion 56, which is downstream from heat exchanger portion 54 and upstream from working fluid cooling and containment portion 58.

Heat exchange portion 54 includes a low-pressure EGR cooler 48 and an exhaust heat exchanger 46 positioned downstream from low-pressure EGR cooler 48.

Energy conversion portion 56 may include an energy conversion turbine 62. While shown and described as a turbine, element 62 is an energy conversion device that may take many forms. For example, energy conversion device 62 may be a piston, a scroll, a screw or other types of expansion devices suitable for coupling energy into energy conversion portion 56. Energy conversion turbine 62 may connect to and drive a gear reduction assembly 64. Depending on the type of energy conversion device 62 used, assembly 64 may be a speed increasing gear train, a speed reducing gear train, or may be a direct one-to-one coupling. Gear reduction assembly 64, which may be a planetary gear reduction or multiple gear pairs, may drive a power shaft 66. Power shaft 66 may have one or more power outlets or power conversion mechanisms 68a and 68b. Power conversion mechanism 68a may include EGR pump 50. As will be seen, power conversion mechanism 68b may rotate via shaft 66 by the action of expanding working fluid vapor rotating turbine 62 to provide additional work. The additional work can be fed into an engine output 70 of engine 12 to supplement the power from engine 12 either mechanically or electrically (e.g., by turning a generator), or it can be used to power electrical devices, parasitics or a storage battery (not shown). For example, power outlet 68 may couple to a gear box 69 located along engine output 70. Gear box 69 may include bevel gears, miter gears, or other power mechanisms suitable for connecting power between energy conversion portion 56 and engine output 70. Turbine 62 may also turn an electrical generator (not shown). The power generated by the generator can be fed into a driveline motor generator (DMG) via power electronics. Alternatively, energy conversion portion 56 can be used to transfer energy from one system to another system (e.g., to transfer heat energy from WHR system 110 to a fluid for a heating system).

Energy conversion portion 56 may include other components and features. For example, shaft 66 may have seals 72, which would prevent contaminants from interfering with operation of gear reduction assembly 64 as well as keeping lubricant closely positioned about gear reduction assembly 64. In the exemplary embodiment, energy conversion portion 56 also includes a clutch 74. Though not shown, bearings would support various elements of energy conversion portion 56.

Control system 20 may include a control module 76 and a wiring harness 78. Control module 76, which may be a single processor, a distributed processor, an electronic equivalent of a processor, or any combination of the aforementioned elements, as well as software, electronic storage, fixed lookup tables and the like, connects to and may control certain components of WHR circuit 10, intake system 14, EGR system 18, and energy conversion system 56. The connection to components of WHR circuit 10 may be through wire harness 78, though such connection may be by other means, including a wireless system. Control module 76 may be an electronic control unit (ECU) or electronic control module (ECM) that monitors the performance of internal combustion engine 12 and other components and conditions of a vehicle in which control module 76 may be located.

Control module 76 may connect to and send signals to bypass valve 43, EGR flow valve 52, working fluid cooling and containment portion 58, feed pump 60, power outlet 68b, and clutch 74. Control module 76 may also connect to and receive signals from various sensors including: a temperature and pressure sensor 80, positioned along WHR circuit 10 between feed pump 60 and working fluid cooling and containment portion 58; a temperature sensor 82, positioned along WHR circuit 10 between exhaust cooler/boiler 46 and low pressure EGR cooler 48; a temperature and pressure sensor 84, positioned along WHR circuit 10 between energy conversion portion 56 and heat exchange portion 54; a temperature and pressure sensor 86, positioned along EGR system 18 between EGR pump 50 and EGR flow valve 52; and a temperature and pressure sensor 88, positioned along intake system 14 between intake manifold 30 and charge air cooler 28. Control module 76 may also receive signals from internal combustion engine 12.

Working fluid cooling and containment portion 58 condenses, cools, and stores a liquid working fluid for WHR circuit 10. The working fluid described can be a non-organic or an organic working fluid. Some examples of working fluid are Genetron® R-245fa from Honeywell, Therminol®, Dowtherm J™ from Dow Chemical Co., Fluorinol® from American Nickeloid, toluene, dodecane, isododecane, methylundecane, neopentane, octane, water/methanol mixtures, and steam.

Feed pump 60 pulls liquid working fluid from containment portion 58 and pushes the liquid working fluid downstream along WHR circuit 10 to heat exchange portion 54. Heat exchanger portion 54 provides a two-step heating process for liquid working fluid flowing through WHR circuit 10. The low-pressure exhaust gas flows downstream from EGR inlet 44 connected to exhaust system 16 into EGR system 18 and through low-pressure EGR cooler 48. The low-pressure exhaust gas raises the temperature of the liquid working fluid. The liquid working fluid flows downstream to exhaust cooler 46, which receives hot exhaust gas from internal combustion engine 12 by way of exhaust system 16. The temperature of the exhaust gas flowing into exhaust cooler 46 is sufficiently hot to change the phase of the liquid working fluid, previously heated by low-pressure EGR cooler 48, to a high-pressure vapor. The high-pressure vapor moves downstream to energy conversion portion 56, rotating energy conversion turbine 62. From energy conversion portion 56, vaporized working fluid returns to working fluid cooling and containment portion 58, thus completing the WHR circuit 10.

As was noted hereinabove, high-pressure vapor rotates turbine 62, which then drives gear reduction assembly 64. Gear reduction assembly 64 may then drive one or more outlets 68. While FIG. 1 shows two inline outlets 68a and 68b, it will be understood that outlets 68a and 68b may be non-collinear by using bevel gears, miter gears, or other gear configurations. It will also be understood that there may be a single power outlet and there may be more than two power outlets. These outlets may be selectively coupled through a clutch or other coupling technique. Outlet 68b may also include a clutch to permit selective coupling of outlet 68b to another location on a vehicle. For example, power from outlet 68b may be coupled to gear box 69, which then combines with engine output 70. Power outlet 68a may be in the form of pump 50 to increase the pressure of EGR gas from EGR system 18. As will be described in more detail hereinbelow, the pressure of the EGR gas may need increased to be able to enter intake system 14. EGR flow valve 52 may regulate the flow of EGR gas into intake system 14, which also lowers the amount of oxygen flowing into the cylinders of internal combustion engine 12, also called in-cylinder oxygen, while maintaining the same amount of gas flowing through internal combustion engine 12. Exhaust gases received from EGR system 18 that are present during the start of combustion are very stable and have a very slow reaction rate during combustion. Exhaust gases present during combustion also absorb heat during combustion, which results in reduced flame temperature, thereby lowering NOx emissions in the exhaust gas from internal combustion engine 12.

Gas, such as air, may enter internal combustion engine 12 through intake system 14. Air, or air that may be mixed with combustible gas or other chemicals, enters intake system through inlet 22. The intake gas passes through compressor 24, which increases the pressure of the intake gas. Because the act of compressing the intake gas increases the temperature of the intake gas, it may be necessary to cool the intake gas prior to entry of the intake gas into internal combustion engine 12. Such cooling may be by way of charge air cooler 28. From charge air cooler 28, intake gas flows toward intake manifold 30, mixing with EGR gas that is able to enter intake system 14 because the EGR gas in EGR system 18 is at a slightly higher pressure than the intake gas because of the action of EGR pump 50. The mixture of EGR gas and intake gas flows to intake manifold 30.

After combustion of EGR gas, intake gas and fuel in internal combustion engine 12, exhaust gases exit internal combustion engine 12 by way of exhaust manifold 34. The exhaust gases have significant flow and pressure, causing turbine 36 to rotate, which, because turbine 36 connects to compressor 24, causes compressor 24 to rotate, which also decreases the pressure of the exhaust gas. The hot exhaust gases may pass through filter 38, which removes particulates from the hot exhaust gas, and catalytic device 40. Catalytic device 40 may include a decomposition reactor where a fine mist of a diesel exhaust fluid (DEF) is sprayed into the hot exhaust gas stream flowing through the decomposition reactor. Through a hydrolysis process, DEF becomes ammonia ($NH_3$). The NOx, together with $NH_3$, passes through a second element, i.e., a selective catalytic reduction element, where a catalytic reaction occurs, converting NOx into harmless $N_2$ gas and water ($H_2O$) vapor.

The pressure of the exhaust gas may decrease further after passing through filter 38 and SCR device 40. The low-pressure exhaust then flows through exhaust cooler 46, where heat from the hot exhaust causes the liquid working fluid flowing through exhaust cooler 46 of WHR circuit 10 to boil or vaporize, as was described hereinabove. The low-pressure exhaust continues flowing downstream toward exhaust outlet, pipe or stack 42. An EGR inlet 44 diverts a portion of the exhaust gas into EGR system 18, described hereinabove, where the low-pressure exhaust gas flows through EGR cooler 48.

An optional exhaust cooler bypass valve 43 may direct some or all of the exhaust gas around exhaust cooler 46. A cooling system (not shown) for internal combustion engine 12 has a capacity to handle the expected worst-case cooling situation internal combustion engine 12 is expected to experience. When internal combustion engine 12 operates under less stringent conditions, the cooling system may have excess cooling capacity. The cooling system for internal combustion engine 12 interfaces with working fluid cooling and containment portion 58, which permits using excess cooling capacity of the cooling system of internal combustion engine 12 to cool WHR circuit 10.

For example, internal combustion engine 12 may send a signal to control module 76 indicating that the cooling system of internal combustion engine 12 is operating above a target level because of high load on engine 12 or high ambient temperatures. To maintain the cooling capacity of engine 12, control module 76 may send a signal to bypass valve 43 to direct some or all exhaust gas around exhaust cooler 46, decreasing the heat rejection required in working fluid cooling and containment portion 58 and permitting the cooling system of engine 12 to return to an optimal range for efficiency and emission control.

Once the cooling system of engine 12 has additional capacity, engine 12 may send a signal to control module 76, which then sends a control signal to valve 43 to direct additional or even all exhaust gas flow through exhaust cooler 46, permitting WHR circuit to recover as much heat energy from the exhaust gas flow as possible.

Bypass valve 43 may be any suitable type of valve capable of controlling the flow of exhaust gas from into internal combustion engine 12 to heat exchange portion 54 and around heat exchange portion 54 to exhaust outlet 42. For example, bypass valve 43 may be movable to a first position permitting flow of exhaust gas downstream to heat exchange portion 54 while blocking flow through bypass portion 41, a second position permitting exhaust gas flow into bypass portion 41 while blocking exhaust gas flow into heat exchange portion 54, and an intermediate position permitting some portion of exhaust gas flow into each of exhaust cooler 46 and exhaust cooler bypass 41. The intermediate position may be variable to control the amount of exhaust gas flow into each of exhaust cooler 46 and exhaust cooler bypass 41 to thereby control the proportion of the downstream exhaust gas flow that passes through exhaust cooler 46 based on the capacity of the cooling system of internal combustion engine 12 and the heat capacity of WHR circuit 10. Valve 43 could also be multiple two-way valves, with a first valve positioned between the aftertreatment portion and exhaust cooler 46 and a second valve positioned between the first valve and the aftertreatment system.

In a circumstance where bypass valve 43 sends insufficient exhaust gas to heat exchange portion 54 to vaporize the working fluid in WHR circuit 10, EGR pump 50 would cease operation. However, gear box 69 continues to be driven by engine output 70. Gear box 69 may now drive power outlet 68b, which now serves as a power inlet to energy conversion portion 56. This input from engine output 70 can then couple to and drive EGR pump 50 by actuation or engagement of clutch 74 by control module 76, which receives at least one signal from temperature and pressure sensor 84, temperature and pressure sensor 86, and other sources indicating the WHR circuit 10 is no longer capable of powering EGR pump 50. Once bypass valve 43 permits exhaust gas to flow through heat exchange portion 54 in an amount sufficient to drive EGR pump 50, engine output 70 may no longer drive EGR pump 50. In circumstances where there is sufficient power from energy conversion portion 56, power may flow from energy conversion portion 56 through power outlet 68b to gear box 69, joining the engine output 70. Control system 20 may also send signals to power outlet 68b, gear box 69, or other devices or mechanisms to disengage energy conversion portion 56 from engine output 70.

Control system 20 may receive signals from various sensors positioned through WHR circuit 10, intake system 14, EGR system 18, and other locations. Control system 20 may use these signals to provide control signals to various locations to control the functions of WHR circuit 10, intake system 14, EGR system 18, and energy conversion portion 56.

A signal from temperature and pressure sensor 80 indicates how close to a saturation temperature the liquid working fluid may be. If the temperature and pressure signal indicates that feed pump 60 is close to cavitation, control module 76 may send a signal to working fluid cooling and containment portion 58 to increase sub-cooling, which increases the cavitation margin of feed pump 60, decreasing the possibility of harmful damage to feed pump 60.

A signal from temperature sensor 82 indicates the amount of heating provided to the working fluid. A signal from temperature and pressure sensor 84 indicates the superheat temperature of the vaporized working fluid. If the superheat temperature is too low, control module 76 may decrease the speed of feed pump 60, which decreases the flow rate (slows the movement) of working fluid through WHR circuit 10, increasing heat transfer in EGR cooler 48 and exhaust cooler 46. Control module 76 may also decrease sub-cooling in working fluid cooling and containment portion 58. Conversely, if the superheat temperature is too high, control module 76 may increase sub-cooling or increase the flow rate of the liquid working fluid by adjusting, i.e. increasing, the speed of feed pump 60.

A signal from temperature and pressure sensor 86 to control module 76 indicates whether the EGR gas has sufficient pressure to enter intake system 14 and whether the temperature of the EGR gas is sufficiently low to optimize efficiency and emission levels in internal combustion engine 12. If the pressure is too low, control module 76 may send a signal to EGR flow valve 52 to control valve 52, i.e., move valve 52 toward a closed position, to decrease the flow rate of EGR gas. If the temperature of the EGR gas is too high, control module 76 may send a signal to EGR flow valve 52 to control valve 52, i.e., move valve 52 toward a closed position, to decrease the flow rate of EGR gas to intake system 14. Control module 76 may also send a signal to feed pump 60 to increase the flow rate of the liquid working fluid to increase cooling of the EGR gas. A signal from temperature and pressure sensor 88 to control module 76 assists control module 76 in determining the ability of intake system 14 to accommodate the temperature and pressure of EGR gas from EGR system 18.

Control module 76 may also control the output of energy conversion portion 56. If internal combustion engine 12 indicates engine output 70 requires augmentation, perhaps due to a need for acceleration, short-term increased peak power, or other transients, control module 76 may send a signal to power outlet 68b to engage power outlet 68b with engine output 70. The engagement of power outlet 68b with engine output 70 may be via a clutch that connects power outlet 68b to engine output 70. If power outlet 68b is engaged to engine output 70, control module 76 may also disengage clutch 74 or modulate clutch 74 to decrease the amount of EGR gas pumped to intake system 14. Control module 76 may then engage clutch 74 to drive pump 50 when EGR gas is again required. Clutch 74 may also be a variable type clutch such as a cone clutch or epicyclical arrangement that permits varying the speed of EGR pump 50.

Engaging power outlet 68b to engine output 70 may optimize emission control in some circumstances. For example, an engine transient may cause incomplete combustion of fuel, leading to an increase in NOx output. By engaging power outlet 68b to augment engine output 70, internal combustion engine 12 may continue to operate in a more favorable region with respect to NOx emissions.

As will be understood, other configurations of the above-described system are possible. For example, expander device/turbine 62 may be positioned to the right of pump 50 with a clutch positioned between pump 50 and expander device 62. In this configuration, there may be no other clutches between pump 50 and engine output 70. Thus, in circumstances where there is more power in energy conversion portion 56 than is provided by engine output 70, pump 50 is driven by energy conversion portion 56 and that power may then flow by a linkage, e.g., a mechanical linkage, to engine output 70. A clutch positioned between expander device 62 and pump 50 might be an overrunning type, thus permitting engine output 70 to drive pump 50 automatically when there is insufficient power available from expander device 62 to drive pump 50. An overrunning clutch would also permit automatic connecting of power from energy conversion portion 56 when the output of energy conversion portion 56 is greater than engine output 70. In these configurations, seal and bearing locations would be adjusted to accommodate the positions of the various components.

While the foregoing discussion describes an EGR flow control valve 52, it should be understood that control valve 52 might be unnecessary in some configurations. In one configuration, pump 50 may regulate EGR flow, and EGR gas flows directly to intake system 14. In another configuration, a check valve may be provided between EGR system 18 and intake system 14 and only when pressure in EGR system 18 is sufficient to cause the check valve to open does EGR gas enter intake system 14.

As will be understood from the foregoing description, the configuration of WHR circuit 10 in combination with exhaust system 16 and low-pressure EGR system 18 permits using a waste heat recovery system to pump and then pressurize EGR gas, rather than using energy to force high-pressure EGR gas to travel from an exhaust manifold to an intake manifold. Using energy to force high-pressure EGR gas to travel from an exhaust manifold to an intake manifold incurs a fuel economy penalty. Because WHR circuit 10 may provide more energy than necessary to pump the low-pressure EGR gas, additional energy is available to support other engine functions.

Figure 2:
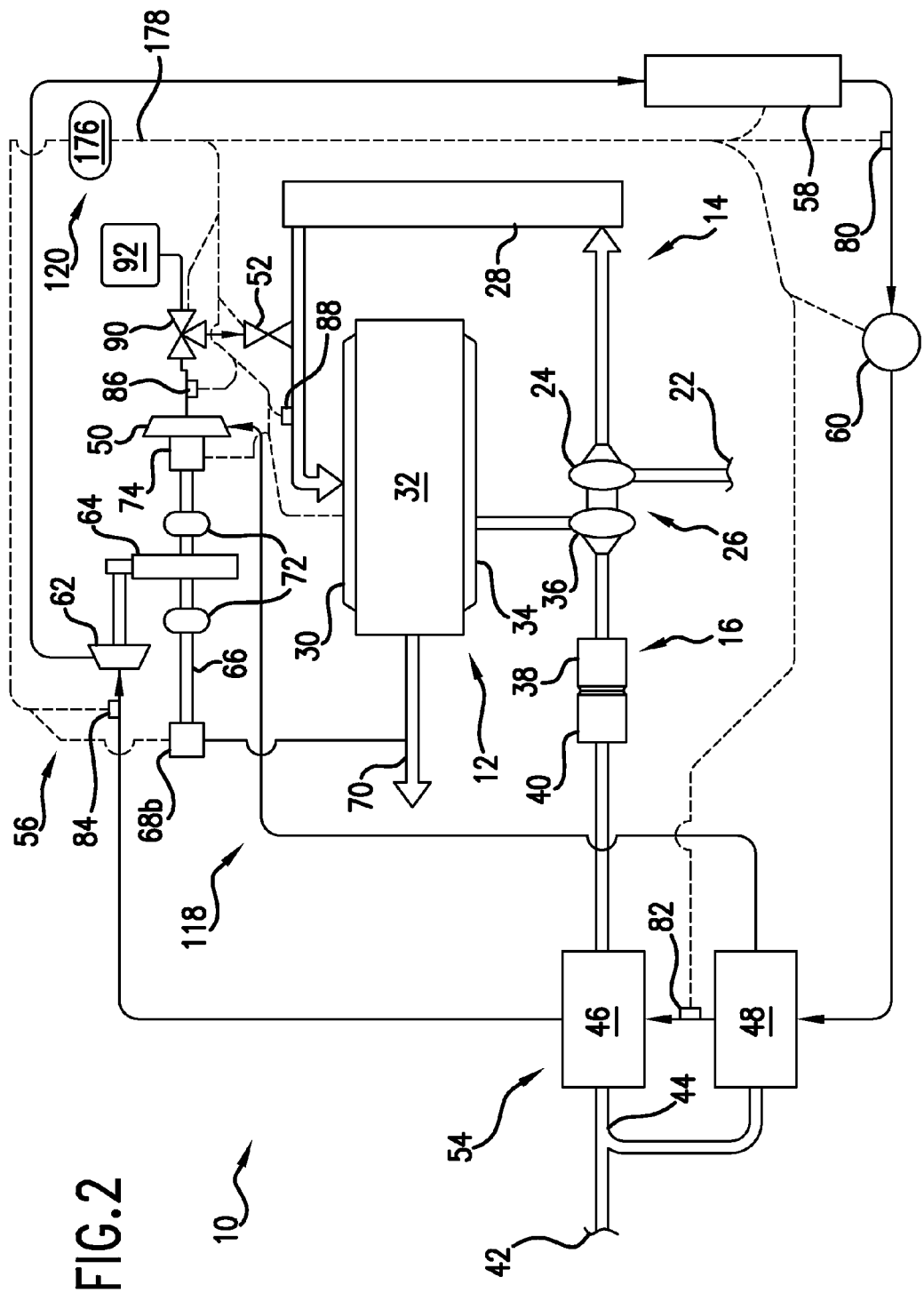
FIG. 2 is a schematic of an internal combustion engine and a Rankine cycle waste heat recovery system in accordance with a second exemplary embodiment of the present disclosure.

FIG. 2 shows a second exemplary embodiment of the present disclosure. In this figure, elements having the same number as those in FIG. 1 work as described hereinabove and are described again only for the sake of clarity.

An EGR system 118 may include a regulator valve 90 positioned downstream from EGR pump 50 and upstream from EGR flow valve 52. Extending from regulator valve 90 may be an accumulator or reservoir 92. A control system 120 may include a control module 176 similar to control module 76 described above and a wiring harness 178 similar to wiring harness 78 described above.

Regulator valve 90 may be any suitable type of valve capable of controlling the flow of EGR gas from EGR pump 50 to intake system 14 and from EGR pump 50 into EGR reservoir 92. For example, regulator valve 90 may be a three-way valve movable to a first position permitting flow of EGR gas downstream to intake system 14 while blocking flow into EGR reservoir 92, a second position permitting EGR gas flow into EGR reservoir 92 while blocking EGR gas flow into intake system 14, and an intermediate position permitting some portion of EGR gas flow into each of EGR reservoir 92 and intake system 14. The intermediate position may be variable to control the amount of EGR gas flow into each of EGR reservoir 92 and intake system 14 to thereby control the proportion of the downstream EGR flow between EGR system 118 and intake system 14 based on the operating conditions of EGR system 118 and intake system 14. Valve 90 could also be multiple two-way valves, with one valve positioned between EGR pump 50 and EGR reservoir 92 and a second valve positioned between EGR pump 50 and intake system 14. In the configuration shown in FIG. 2, EGR flow valve 52 may be eliminated if valve 90 is controllable by control module 176.

Control module 176 continuously receives signals from temperature and pressure sensor 88. If the temperature of the intake gas is below a target level, which may occur during engine start and warm up, during aftertreatment regeneration, or under other, similar conditions, control module 176 may determine that EGR gas flow needs decreased. Control module 176 also continuously receives signals from temperature and pressure sensor 86. If the temperature of the EGR gas in EGR system 18 is above an optimum level for reduction of NOx formation, as determined by control module 176, control module 176 may determine that EGR gas flow needs decreased. To decrease the flow of EGR gas, control module 176 may send a signal to regulator valve 90 to cause regulator valve 90 to direct some or all EGR gas flow to EGR reservoir 92. The EGR gas held in EGR reservoir 92 may be maintained until temperature and pressure sensor 88 and temperature and pressure sensor 86 indicates a need for additional EGR gas flow beyond the ability of EGR pump 50 to supply, such as might occur during engine transient operation, during engine start-up, and under other conditions where insufficient power is available from energy conversion portion 56. In any of these situations, control module 176 may open valve 90 to permit EGR gas to flow from reservoir 92 to intake system 14, thus continuing to maintain the benefits of EGR gas flow even when flow from EGR pump 50 is below a target level. Though not shown, EGR reservoir 92 may receive cooling from air or liquid cooling sources.

It should be understood from the foregoing discussions that control module 76 and control module 176 try to optimize the efficiency of internal combustion engine 12. Such optimization generally leads to decreased formation of NOx during combustion in engine 12, decreasing the need to mitigate NOx in exhaust system 16. Thus, by receiving signals from the various sensors previously described and sending control signals to the controllable elements previously described, control module 76 and control module 176 continuously monitor the function of WHR circuit 10, intake system 14, and EGR system 18 or EGR system 118 and operate these systems to assist internal combustion engine 12 in maintaining efficiency and lowest attainable NOx output.

It should also be understood from the foregoing discussions that exhaust cooler bypass 41 shown in FIG. 1 is compatible with the configuration of FIG. 2. Similarly, EGR accumulator or reservoir 92 and regulator valve 90 are compatible with the configuration of FIG. 1.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an intake system;
an exhaust system operable to transport an exhaust gas and including an exhaust outlet;
a turbocharger turbine positioned along the exhaust system;
an aftertreatment system positioned along the exhaust system downstream from the turbocharger turbine;
an exhaust gas recirculation (EGR) system connected to the exhaust system downstream of the aftertreatment system and operable to divert a portion of the exhaust gas from the exhaust system, said EGR system connected to the intake system of the internal combustion engine, said EGR system including an EGR pump positioned upstream of the intake system and adapted to selectively control a flow rate of EGR gas into the intake system; and
a Rankine cycle waste heat recovery system including a waste heat recovery circuit, a working fluid pump positioned along the waste heat recovery circuit, an EGR heat exchanger positioned along the waste heat recovery circuit downstream from the working fluid pump and adapted to receive EGR gas, an exhaust gas boiler positioned along the waste heat recovery circuit downstream from the EGR heat exchanger and adapted to receive exhaust gas, an energy conversion portion positioned along the waste heat recovery circuit downstream from the exhaust gas boiler, the energy conversion portion coupleable to each of the EGR pump and an engine output, the energy conversion portion operable to selectively drive the EGR pump via power from at least one of the energy conversion portion and the engine output, and a condenser positioned along the waste heat recovery circuit downstream from the energy conversion portion and upstream from the working fluid pump.

2. The internal combustion engine of claim 1, wherein the energy conversion portion includes a gear reduction.

3. The internal combustion engine of claim 1, further comprising a clutch operable to engage and disengage the EGR pump.

4. The internal combustion engine of claim 1, further including a turbocharger compressor driven by the turbocharger turbine, the turbocharger compressor being operable to pump an intake gas into the intake system.

5. The internal combustion engine of claim 1, further including an EGR reservoir positioned along the EGR system between the EGR pump and the intake system.

6. The internal combustion engine of claim 5, further including a regulator valve positioned between the EGR system and the EGR reservoir.

7. The internal combustion engine of claim 6, where the regulator valve further includes a first position where the EGR gas is directed to the intake system, a second position where the EGR gas is directed to the EGR reservoir, and a third position where the EGR gas is directed to both the EGR reservoir and the intake system.

8. The internal combustion engine of claim 6, wherein the regulator valve is a proportional valve.

9. The internal combustion engine of claim 1, further including an EGR flow valve positioned along the EGR system between the EGR pump and the intake system.

10. An internal combustion engine, comprising:
an intake system;
an exhaust system operable to transport an exhaust gas and including an exhaust outlet; a turbocharger turbine positioned along the exhaust system;
an aftertreatment system positioned along the exhaust system downstream from the turbine;
an exhaust gas recirculation (EGR) system connected to the exhaust system downstream of the aftertreatment system and operable to divert a portion of the exhaust gas from the exhaust system, the EGR system connected to the intake system of the internal combustion engine, the EGR system including an EGR pump positioned upstream of the intake system and adapted to selectively control a flow rate of EGR gas into the intake system;
a Rankine cycle waste heat recovery system including a waste heat recovery circuit, a working fluid pump positioned along the waste heat recovery circuit, an EGR heat exchanger positioned along the waste heat recovery circuit downstream from the working fluid pump and adapted to receive EGR gas, an exhaust gas boiler positioned along the waste heat recovery circuit downstream from the EGR heat exchanger and adapted to receive exhaust gas, an energy conversion portion positioned along the waste heat recovery circuit downstream from the exhaust gas boiler, the energy conversion portion coupleable to each of the EGR pump and an engine output, the energy conversion portion having an output operable to selectively drive the EGR pump via power from at least one of the energy conversion portion and the engine output, and a condenser positioned along the waste heat recovery circuit downstream from energy conversion portion and upstream from the working fluid pump; and a control system operable to control the output of the energy conversion portion.

11. The internal combustion engine of claim 10, further including a sensor positioned along the EGR system between the EGR pump and the intake system, the sensor configured to send a pressure signal to the control system, and the control system configured to send a signal to the energy conversion portion to adjust the output of the energy conversion portion by operating a clutch associated with the EGR pump based on the pressure signal.

12. The internal combustion engine of claim 10, the energy conversion portion having a first power outlet and a second power outlet, and the control system configured to receive a signal from the internal combustion engine and based on the signal selectively engage the first power outlet and the second power outlet.

13. The internal combustion engine of claim 10, further including an EGR reservoir positioned along the EGR system between the EGR pump and the intake system.

14. The internal combustion engine of claim 13, further including a regulator valve positioned between the EGR system and the EGR reservoir.

15. The internal combustion engine of claim 14, wherein the internal combustion engine generates a signal indicative of the operational condition of the engine and transmits the signal to the control module, the control module determines from the signal that additional EGR gas is required in the intake system and the control module sends a control signal to the regulator valve to connect the EGR reservoir to the intake system.

16. The internal combustion engine of claim 14, wherein the internal combustion engine generates a signal indicative of the operational condition of the engine and transmits the signal to the control module, the control module determines from the signal that less EGR flow is required in the intake system and the control module sends a control signal to the regulator valve to divert at least some EGR flow to the EGR reservoir.

17. The internal combustion engine of claim 14, wherein the regulator valve has a first position where the EGR gas is directed to the intake system, a second position where the EGR gas is directed to the EGR reservoir, and a third position where the EGR gas is directed to both the EGR reservoir and the intake system, and the control system moves the regulator valve to each position.

18. The internal combustion engine of claim 14, wherein the regulator valve is a proportional valve.

19. The internal combustion engine of claim 10, further comprising an EGR flow valve positioned between the EGR pump and the intake system and configured to receive a control signal from the control system to open, partially open, or close depending on a signal the control system receives from the internal combustion engine.

* * * * *